(12) United States Patent
Maucec et al.

(10) Patent No.: US 9,260,948 B2
(45) Date of Patent: Feb. 16, 2016

(54) MULTI-LEVEL RESERVOIR HISTORY MATCHING

(75) Inventors: Marko Maucec, Englewood, CO (US);
Gustavo Carvajal, Katy, TX (US);
Seyed M. Mirzadeh, Houston, TX (US);
Ajay Pratap Singh, Houston, TX (US);
Hasnain A. Khan, Houston, TX (US);
Luigi A. Saputelli, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 441 days.

(21) Appl. No.: 13/563,270

(22) Filed: Jul. 31, 2012

(65) Prior Publication Data

US 2014/0039859 A1    Feb. 6, 2014

(51) Int. Cl.
*G06G 7/48*    (2006.01)
*G06F 7/60*    (2006.01)
*E21B 43/00*    (2006.01)
*G01V 99/00*    (2009.01)

(52) U.S. Cl.
CPC .................. *E21B 43/00* (2013.01); *G01V 99/00* (2013.01)

(58) Field of Classification Search
CPC ....... G06N 7/005; G06N 3/126; G01V 99/00; G01V 99/005; G01V 2210/663; G01V 2210/62; E21B 43/00
USPC ........................................................ 703/10, 2
See application file for complete search history.

(56) References Cited

U.S. PATENT DOCUMENTS

| | | | |
|---|---|---|---|
| 7,657,494 B2* | 2/2010 | Wilkinson et al. | 706/13 |
| 8,285,532 B2* | 10/2012 | Zangl | E21B 49/00 |
| | | | 703/10 |
| 8,352,226 B2 | 1/2013 | Cullick et al. | |
| 2005/0015231 A1* | 1/2005 | Edwards et al. | 703/10 |

(Continued)

FOREIGN PATENT DOCUMENTS

WO    2014/022317    2/2014

OTHER PUBLICATIONS

Busby et al., Uncertainty Reduction by Production Data Assimilation Combining Gradual Deformation with Adaptive Response Surface Methodology (SPE-121274), Jun. 2009, Managing Uncertainty II (EUROPEC), 71st EAGE Conference & Exhibition, pp. 1-11.*

(Continued)

*Primary Examiner* — Kamini S Shah
*Assistant Examiner* — Juan Ochoa
(74) *Attorney, Agent, or Firm* — Krueger Iselin LLP; John W. Wustenberg

(57) ABSTRACT

The present disclosure describes systems and methods for performing multi-level reservoir history matching. At least some illustrative embodiments include a method that includes generating a first history-matched model using at least one updated model parameter derived from one or more existing model parameters, generating a set of second history-matched models by applying a probabilistic inversion to the first history-matched model, and deriving a set of third history-matched models from the set of second history-matched models. The method further includes generating dynamic simulation realization sets using each of the set of third history-matched models, ranking each of the set of third history-matched models based at least in part on the dynamic simulation realization sets, and presenting a production forecast to a user based on the highest ranked third history-matched models.

22 Claims, 4 Drawing Sheets

(56) References Cited

U.S. PATENT DOCUMENTS

| | | | |
|---|---|---|---|
| 2007/0179766 A1 | 8/2007 | Cullick et al. | |
| 2008/0082469 A1* | 4/2008 | Wilkinson et al. | 706/13 |
| 2009/0157590 A1 | 6/2009 | Mijares et al. | |
| 2011/0125476 A1* | 5/2011 | Craig | 703/10 |
| 2012/0158389 A1* | 6/2012 | Wu et al. | 703/10 |
| 2012/0215502 A1 | 8/2012 | Mijares et al. | |
| 2012/0232865 A1 | 9/2012 | Maucec et al. | |

OTHER PUBLICATIONS

Stephen et al., A multiple model approach to history matching and uncertainty analysis using time-lapse seismic, Aug. 30-Sep. 2, 2004, 9th European Conference on the Mathematics of Oil Recovery, Cannes, France, pp. 1-8.*

Okano et al., Quantification of Uncertainty Due to Sub-Grid Heterogeneity in Reservoir Models (SPE100223), Jun. 15-16, 2006, SPE Europec/EAGE Annual Conference and Exhibition, Vienna, Austria, pp. 1-11.*

Scheidt et al., "Representing spatial uncertainty using distances and kernels", 2009, Mathematical Geosciences 41.4, pp. 397-419.*

Maucec et al., "Geology-guided Quantification of Production-Forecast Uncertainty in Dynamic Model Inversion", 2011, Society of Petroleum Engineers, Annual Technical Conference and Exhibition, pp. 1-17.*

Al-Abbasi, Adel et al., Abstract, "Enabling Numerical Simulation and Real-Time Production Data to Monitor Water-Flooding Indicators", 2013 SPE Digital Energy. Mar. 5, 2013. The Woodlands, TX., abstract,(Jul. 23, 2012),1 pg.

Landa, Jorge L. et al., "A Methodology for History Matching and the Assessment of Uncertainties Associated with Flow Prediction", SPE 84465 SPE Annual Technical Conference and Exhibition, Denver CO. Oct. 5, 2003, 14 pgs.

Maucec, Marko et al., "Streamline-Based History Matching and Uncertainty: Markov-chain Monte Carlo Study of an Offshore Turbidite Oil Field", SPE 109943. 2007 SPE Annual Technical Conference and Exhibition, Anaheim, CA. Nov. 11, 2007, 16 pgs.

Thiele, M.R. et al., "Streamline Simulation for Modern Reservoir-Engineering Workflows", Jan. 2010 Journal of Petroleum Technology, pp. 64-70, (Jan. 2010),7 pgs.

PCT International Preliminary Report on Patentability, dated Sep. 19, 2014, Appl No. PCT/US2013/052587, "Multi-Level Reservoir History Matching," Filed Jul. 28, 2013, 13 pgs.

PCT International Search Report and Written Opinion, dated Feb. 14, 2014, Appl No. PCT/US2013/052587, "Multi-Level Reservoir History Matching," Filed Jul. 28, 2013, 18 pgs.

* cited by examiner

MULTI-LEVEL RESERVOIR HISTORY MATCHING

RELATED APPLICATIONS

This application is related to co-pending PCT application no. PCT/US2009/058504 (hereafter the '504 application) titled "Systems and Methods for the Quantitative Estimate of Production-forecast Uncertainty," which is hereby incorporated by reference.

BACKGROUND

Oil field operators dedicate significant resources to develop tools that help improve the overall production of oil and gas wells. Among such tools are computer-based models used to simulate the behavior of the fluids within a reservoir (e.g., water, oil and natural gas). These models enable operators to predict future production of the field as fluids are extracted and the field is depleted. To help ensure the accuracy of such predictions, the wells are periodically logged using production logging tools to update and maintain a historical database of relevant metrics for the wells within a field. Simulation model results may then be regularly correlated against the updated historical data, with modeling parameters being adjusted as needed to reduce the error between simulated and actual values.

Accurately matching a simulation to historical data, however, can be a challenging task given the number of modeling parameters, the complexity of their interactions, the uncertainty in the values of the parameters, and the non-uniqueness of model realizations that may match a given set of historical data. The process of history matching a simulation model may involve the execution of thousands of simulations, which can be computationally demanding for large fields with a large number of wells. While a number of stochastic techniques such as Bayesian sampling and Monte Carlo methods may be used to reduce the computational burden incurred to achieve a given level of accuracy, the continually increasing amount of data being sampled in the field and stored on historical databases, as well as the increasing complexity of the simulations themselves, continue to fuel the demand for systems and methods that decrease the number of simulation realizations needed to achieve a meaningful history match of a simulation model.

BRIEF DESCRIPTION OF THE DRAWINGS

A better understanding of the various disclosed embodiments can be obtained when the following detailed description is considered in conjunction with the attached drawings, in which.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

The paragraphs that follow describe various illustrative systems and methods for multi-level reservoir history matching. An illustrative reservoir map showing the predicted effect of injector and producer wells on the state of the history-matched modeled reservoir is first described, followed by an illustrative production logging facility used to collect and process production data used to update the history data. A high level flow diagram of the production and historical data and the data's integration into the history matching process is then described. Finally, a method for performing multi-level reservoir history matching and a data acquisition and processing system suitable for processing production data and performing software-based embodiments of the method are described in detail.

Figure 1:
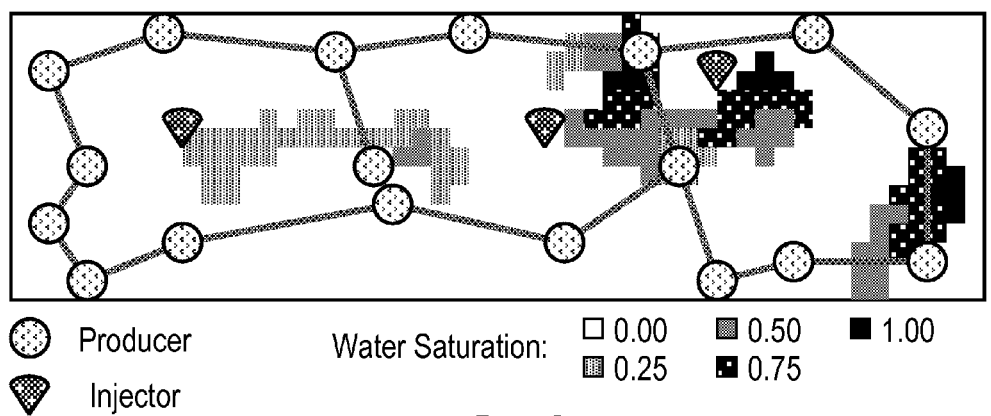
FIG. 1 shows a reservoir map of a field providing source data and being simulated as part of an illustrative history matching.

FIG. 1 shows a map displaying the water saturation of a reservoir as forecast by a simulation model incorporating at least some of the illustrative embodiments described herein. The map shows the level of water saturation for various regions within the reservoir as identified by the history-matched models used by the reservoir simulator, which typically includes both static and dynamic simulations. Producer wells are connected by imaginary lines to illustrate the producer well pattern formed around each injector well. Shading indicates the level of water saturation within the reservoir, though other illustrative embodiments may use color for the same purpose. A user of the system may vary the placement of the injector and producer wells, as well as the pressure and volume of the injected water in order to determine the best enhanced oil recovery (EOR) design for the reservoir. Although the example map of FIG. 1 is a two-dimensional map, other illustrative embodiments may use three-dimensional maps to provide a more detailed assessment that takes into account variations in the reservoir as a function of depth. Also, although only water saturation is shown, a wide variety of other reservoir metrics may be shown on a map like that of FIG. 1, including but not limited to original oil in place (OOIP), reservoir pressure, water and oil cuts and flowing bottom hole pressures, just to name a few examples.

Figure 2:
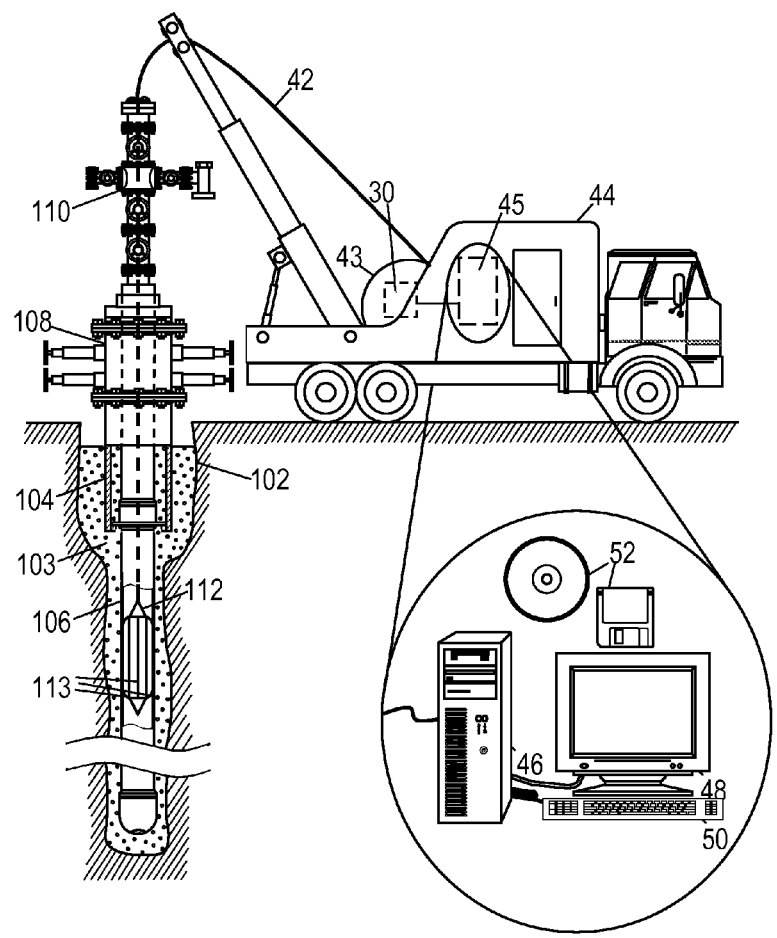
FIG. 2 shows a production logging facility that sources reservoir data suitable for use by an illustrative history matching.

Data from each producer well is collected regularly to track changing conditions in the reservoir. FIG. 2 shows an example of a producer well with a borehole 102 that has been drilled into the earth. Such boreholes are routinely drilled to ten thousand feet or more in depth and can be steered horizontally for perhaps twice that distance. The borehole shown is part of a producer well that includes a casing header 104 and casing 106, both secured into place by cement 103. Blowout preventer (BOP) 108 couples to casing header 106 and production wellhead 110, which together seal in the well head and enable fluids to be extracted from the well in a safe and controlled manner.

Measurements are periodically taken at the producer well and combined with measurements from other wells within a reservoir, enabling the overall state of the reservoir to be simulated and assessed. These measurements may be taken using a production logging tool (PLT) such as wireline PLT 112 of FIG. 2. Such a tool is generally lowered into the borehole and subsequently pulled back up while measurements are taken as a function of borehole position and azimuth angle. In the embodiment shown, PLT 112 is implemented as a sensing instrument sonde suspended by a cable 42 deployed from reel 43 and having conductors for transporting power to the tool and telemetry from the tool to the surface. PLT 112 may have pads and/or centralizing springs (such as centralizing springs 113) to maintain the tool near the axis of the borehole as the tool is pulled uphole. In at least some illustrative embodiments, the pads, when present, may also house transducers used to determine at least some characteristics of the surrounding formation, as well as of the fluids in the formation and in the borehole. Another alternative logging technique that may be used is logging with coil tubing, in which cable 42 is replaced with coil tubing pulled from reel 43 and pushed downhole by a tubing injector positioned at the top of production wellhead 110. While wireline and coil tubing logging systems use different techniques for positioning tools within the borehole, both systems collect and process data substantially in the same manner. Also, measurement devices may be embedded within casing 106 to provide additional data that may be collected and used by at least some of the described embodiments.

Continuing to refer to FIG. 2, surface logging facility 44 collects measurements from PLT 112, and includes a surface module 30 coupled to cable 42 (e.g., via rotary connectors) and to a computer system 45, which processes and stores the measurements gathered by PLT 112. In at least some alternative embodiments, telemetry may be communicated between PLT 112 and computer system 45 wirelessly. Computer system 45 communicates with PLT 112 during the logging process, or alternatively is configured to download data from PLT 112 after the tool assembly is retrieved. Computer system 45 includes a general purpose processing system 46 that is preferably configured by software (shown in FIG. 2 in the form of removable, non-transitory (i.e., non-volatile) information storage media 52) to process the logging tool measurements. The software may also be downloadable software accessed through a network (e.g., via the Internet). Computer system 45 also includes a display device 48 and a user-input device 50 to enable a human operator to interact with the system software 52.

In at least some illustrative embodiments, PLT 112 includes a navigational sensor package that includes directional sensors for determining the inclination angle, the horizontal angle, and the rotational angle (a.k.a. "tool face angle") of PLT 112. As is commonly defined in the art, the inclination angle is the deviation from vertically downward, the horizontal angle is the angle in a horizontal plane from true North, and the tool face angle is the orientation (rotational about the tool axis) angle from the high side of the borehole. In accordance with known techniques, directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of PLT 112 can be determined. Additionally, a three axis magnetometer measures the earth's magnetic field vector in a similar manner. From the combined magnetometer and accelerometer data, the horizontal angle of the logging assembly can be determined. These orientation measurements, when combined with measurements from motion sensors, enable the tool position to be tracked downhole.

The characteristics of the surrounding formation, as well as of the fluids in the formation and in the borehole, measured by production logging tools include, but are not limited to, formation permeability and porosity, fluid flow rates and fluid oil/water/gas proportions, just to name a few examples. To acquire such measurements, a typical production logging tool may include, for example, a fluid flow meter, a temperature tool, a pressure tool, a density tool, a gamma ray tool and a capacitance tool. Measurements acquired using such an array of tools enable identification of the type and amount of fluid contained by, and flowing within, a reservoir through one or more wells.

Figure 3:
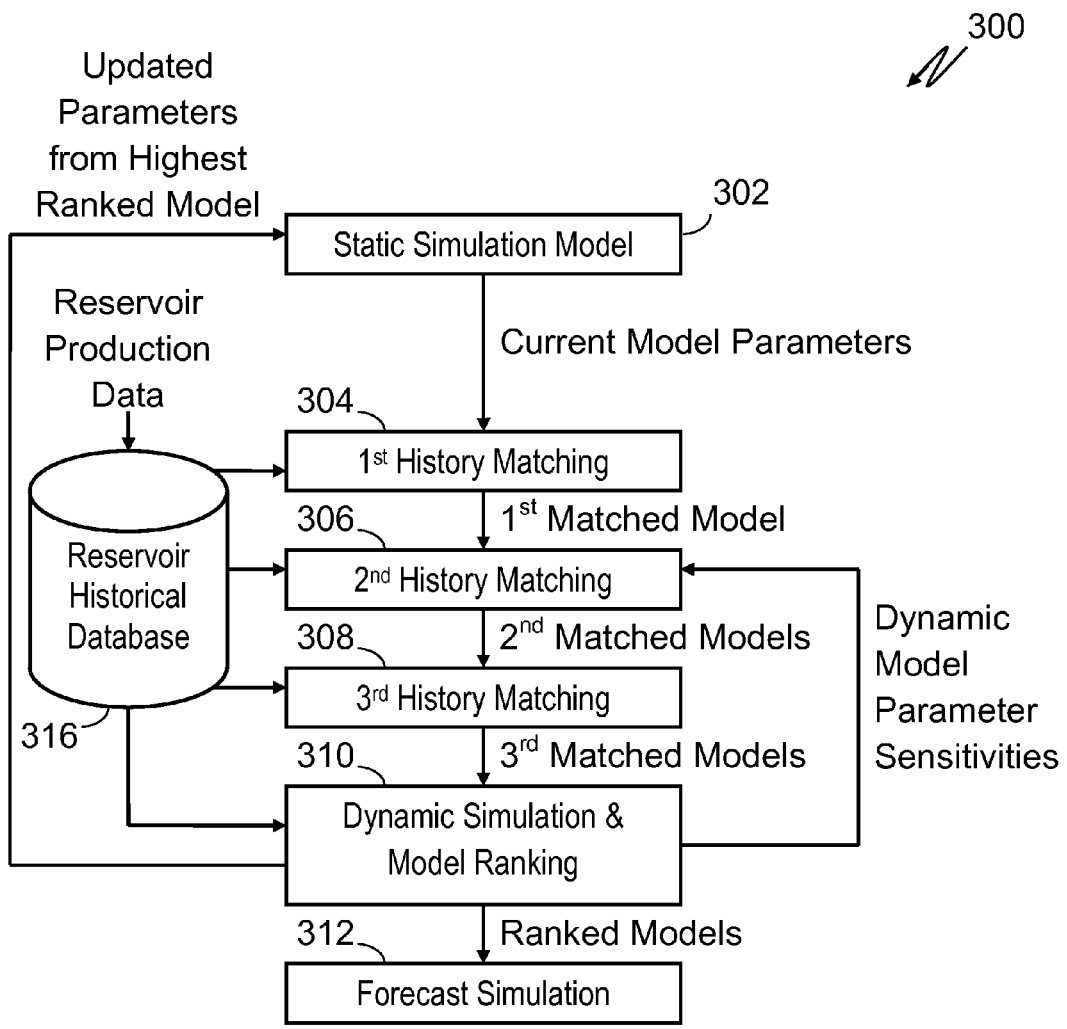
FIG. 3 shows an illustrative history matching data flow of reservoir production and history data.

As measurement data is acquired over time and added to a historical database, known past reservoir conditions are periodically simulated to produce realizations that are compared against actual collected historical data reflecting those same reservoir conditions. The model parameters are adjusted as needed to reduce the error between the model realizations and the historical data and thus maintain and improve the accuracy of the model over time. FIG. 3 shows an illustrative data flow 300 that describes this process. Current static model parameters for static simulation model 302 (e.g., a high-resolution static geocellular model) are provided to the first history matching 304, and the model is iteratively applied to a dataset reflecting known past reservoir conditions, which is regularly updated with reservoir production data (e.g., daily or continuously in real-time). The model simulates static conditions in the reservoir (e.g., pressure as a function of location within the reservoir) at a fixed point in time. The reservoir is typically subdivided into cells in either two or three dimensions, with the simulation performed on a cell-by-cell basis.

To perform the first history matching 304, at least one parameter is varied over a range of values, with a simulation realization being produced for each of a fixed number of parameter values within the range. The data from each realization is compared with the corresponding historical data from reservoir historical database 316, and the model with the parameters that produces the smallest error between the simulated and historical data is selected (e.g., using a least squares approach). This process of varying a parameter value and selecting the model with the parameter value that produces the most accurate realization may be repeated for multiple parameters, and acts as a pre-filter wherein a few parameters may be used to reduce the number of models presented to subsequent history matchings.

The result of the first history match 304 is a first history-matched model, which is used by the second history matching 306 to generate a set of realizations. The data from these realizations is used by the second history matching 306 to produce updated values for model parameters other than those varied in the first history matching 304. This parameterization of the data may be performed using any of a number of known techniques such as, for example, a discrete cosine transform. Once the parameterization is completed, the second history matching 306 performs random samplings of probability distributions of each parameter (e.g., using a Markov chain Monte Carlo algorithm). A two stage assessment of the models resulting from the sampling is performed by the second history matching 306, producing a reduced subset of history-matched models (the second matched models of FIG. 3). The first stage performs calculations that are based upon parameter sensitivities and are less computationally intensive than those performed in the second stage. In at least some embodiments, a plurality of second history-matched models are generated by applying a probabilistic inversion to the first history-matched model.

The second matched models are provided to the third history matching 308, which performs a history matching similar to that performed by the first history matching. At least one parameter is varied over a range of parameter values, producing simulation realizations for each of the first matched models. The parameter value that produces the smallest realization data error relative to the historical data is used to update each corresponding second matched model. As before, the process may be repeated for multiple parameters. The third history matching 308 thus produces a set of history-matched models (the third matched models of FIG. 3) with fined tuned values for the parameters varied by this matching.

The third matched models are provided to dynamic simulation and model ranking 310, which performs a full-physics simulation using each of the models. The simulation also identifies parameter sensitivities based on differences in model realizations as a function of differences in the parameter values, which may be used by future executions of the second history matching 306. The realizations of each model are ranked based upon the validated reservoir connectivity and the predicted ultimate recovery factor (URF). The dynamic ranking may be performed by a wide variety of algorithms such as, for example, a kernel k-means clustering algorithm. The selected ranked matched models (e.g., the P10, P50 and P90 models) are forwarded to forecast simulation 312, which performs full-physics forward modeling using the ranked matched models to predict the future performance of the reservoir. The model parameters for any of the ranked model may also be used to update the parameters of static simulation model 302. In at least some illustrative embodiments, a user of the system selects which model is used to update the static simulation model's parameters. Different models may be selected for the parameter update, for example, to test different scenarios for production forecasting using different updated parameters.

Figure 4:
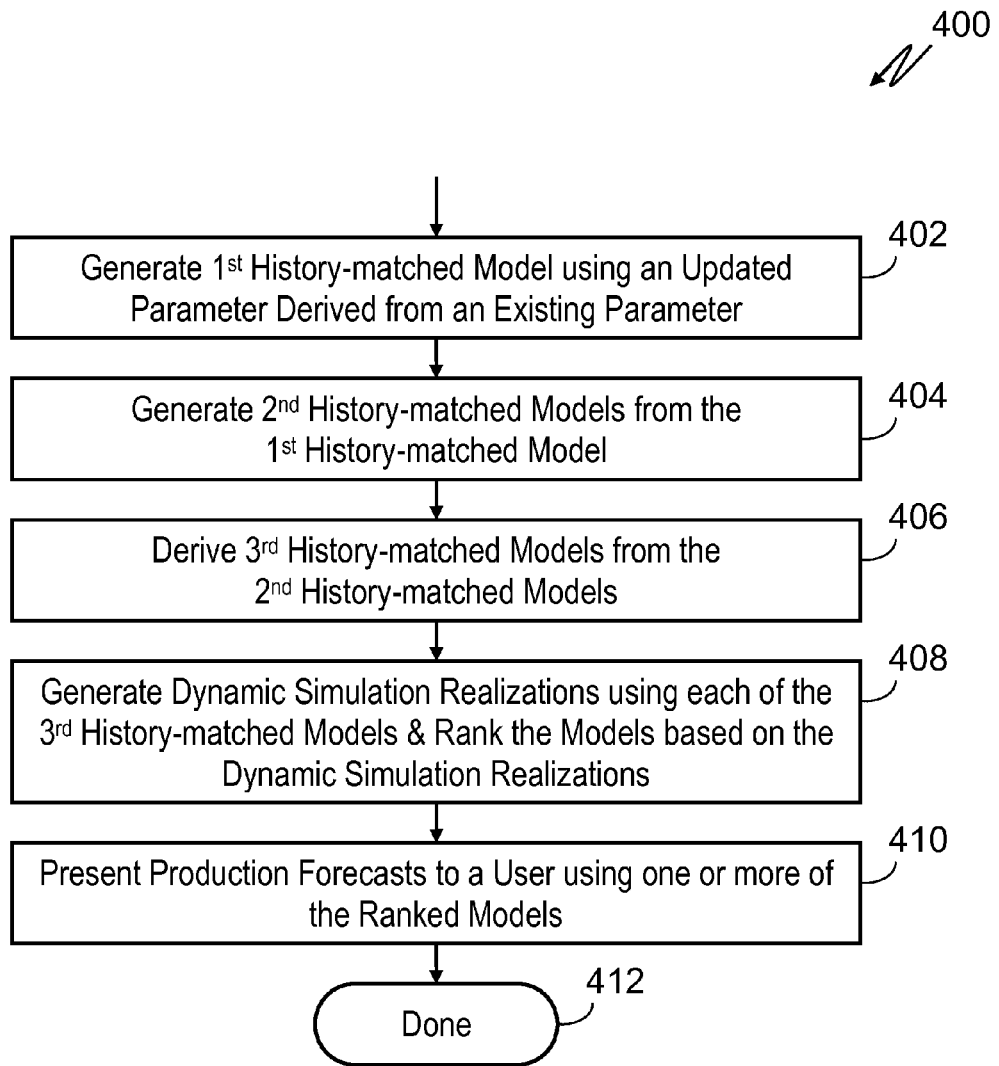
FIG. 4 shows an illustrative multi-level reservoir history matching method.
Figure 5:
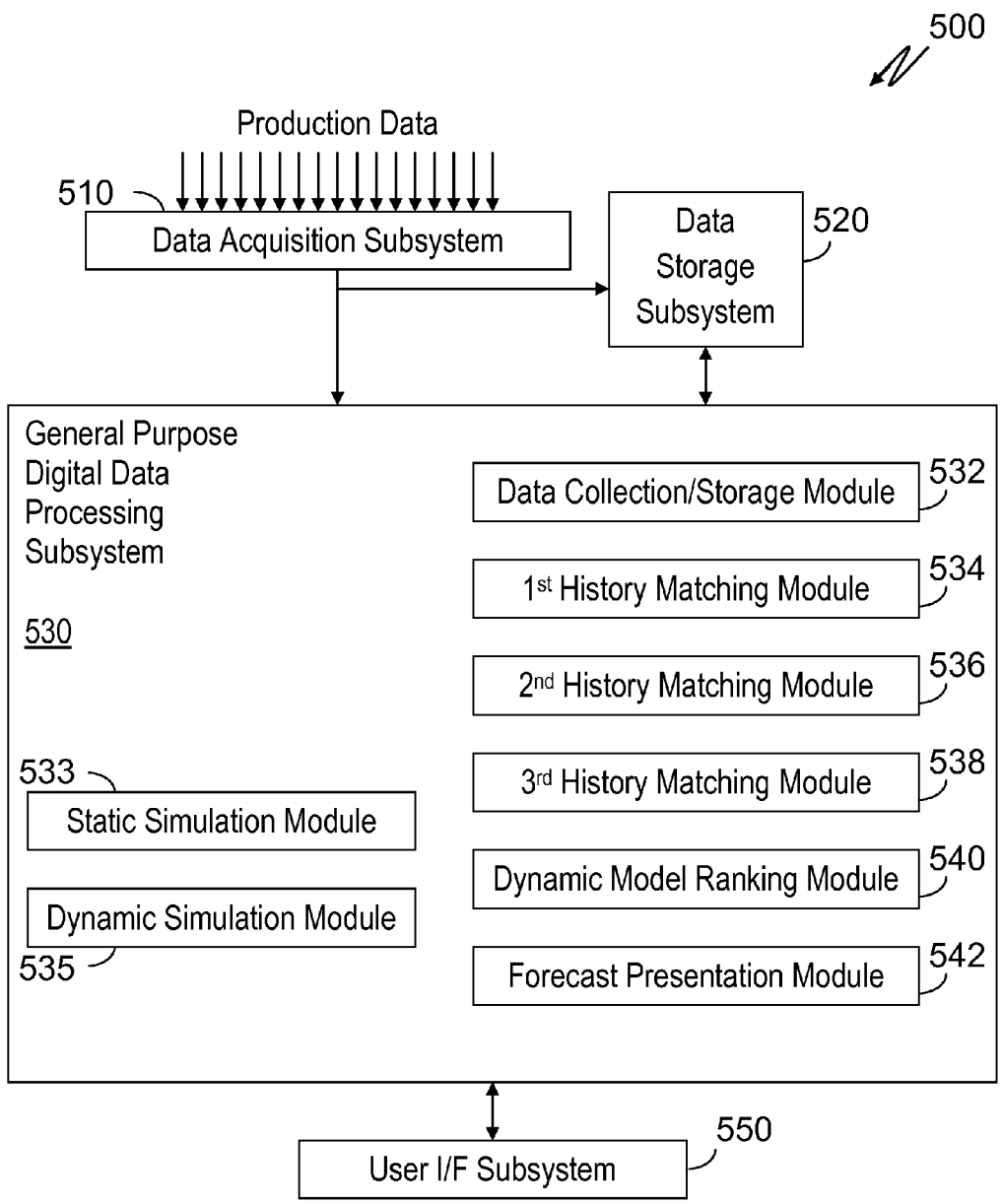
FIG. 5 shows an illustrative data acquisition and processing system suitable for implementing software-based embodiments of the systems and methods described herein.

The preceding paragraphs described the flow of data through a system implementing the multi-level history matching described herein. The paragraphs that follow describe the multi-level history matching in detail while referencing FIGS. 4 and 5. FIG. 4 shows an illustrative method 400 for performing the above-described multi-level history matching. FIG. 5 shows an illustrative general purpose computer system 500, which includes a data acquisition subsystem 510, data storage subsystem 520, general purpose digital data processing subsystem 530 and user interface subsystem 550, and which implements method 400 in software. Production data from the reservoir is sampled by data acquisition subsystem 510 and collected and stored by data collection/storage module 532 onto data storage subsystem 520. In at least some illustrative embodiments, modules 533-542 may be present as shown within the same system that collects the reservoir production data (e.g., surface system logging facility 44 of FIG. 2), while in other illustrative embodiments modules 533-542 may be part of a separate data processing system at a remote location (e.g., a data center) that receives and processes the production data as described below.

Continuing to refer to FIGS. 4 and 5, a user operating the system 500 via user interface subsystem 550 triggers the execution of software that implements multi-level history matching method 400, which begins by varying a selected parameter of an existing model over a range of values and generating model realizations using a static reservoir simulator (FIG. 5, first history matching module 532 and static simulation module 533). Each realization corresponds to an updated parameter value within the range of values. In at least some illustrative embodiments, the parameter values may be generated by dividing the range into N intervals to create N+1 values $V_i$ ranging from $V_0$ through $V_N$. In other illustrative embodiments, the values may be randomly and/or stochastically selected from the range. Other techniques suitable for selecting updated parameter values will become apparent to those of ordinary skill in the art, and all such techniques are within the scope of the present disclosure.

Once generated, the realizations produced by the models with updated parameters are used by first history matching module 534 as a basis for selecting the first history-matched model (FIG. 4, block 402). In at least some illustrative embodiments, simulations are performed using a set of known reservoir conditions to create a set of model realizations for each updated parameter value, and each set is history matched against the actual historical reservoir values corresponding to the known reservoir conditions. The model corresponding to the realization set that best meets a match criterion or criteria (e.g., having a simulated value that differs least than other simulated values from the corresponding historical value) is selected as the history-matched model provided to the next history matching module. The degree to which the model realizations match the historical data may be assessed using any of a number of known techniques (e.g., a least squares approach or a neighborhood algorithm), and all such techniques are within the scope of the disclosure. In at least some illustrative embodiments, parameters that may be varied and their corresponding match include, but are not limited to, varying a net-to-gross (NTG) ratio, a facie type, a rock type and/or an initial water saturation while matching an OOIP ratio, and varying a pore volume while matching a reservoir pressure. In at least some illustrative embodiments, matchings within the first history match are performed sequentially. Thus, for example, the OOIP ratio may first be matched, and the model with the updated OOIP-related parameters subsequently used for varying pore volumes while matching the reservoir pressure to produce the matched reservoir realizations.

The first history-matched model is used by the second history module 536 to produce the second history-matched models (block 404). The second history module 536 generates model realizations from the first history-matched model, and these realizations are parameterized to produce corresponding model parameters, such as reservoir connectivity, permeability, porosity, NTG and facie distribution, just to name a few examples. In at least some illustrative embodiments, the parameterization is performed using a discrete cosine transform (DCT) algorithm such as that described in the '504 Application. Other mathematical techniques algorithms may be suitable for parameterizing the matched model realizations, and all such techniques and algorithms are within the scope of the present disclosure. In at least some embodiments, a second history matching module or related software generates a plurality of second history-matched models by applying a probabilistic inversion to the first history-matched model.

Once the realizations of the first history-matched model are parameterized, second history matching module 536 statistically samples the resulting parameters according to a selected probability distribution, combines the samples with likelihood objective functions and assesses the resulting likelihood against acceptance criteria to produce the second history matched models. The likelihood objective function quantifies the degree of uncertainty in each parameter, which translates into variations in the parameter values that follow a selected probability distribution. Each set of variations produces a candidate model that reflects the combined uncertainty of each of the parameters. In at least some illustrative embodiments the sampling and combining are performed using Bayesian sampling in the form of a Markov chain Monte Carlo algorithm, such as that described in the '504 application. Other mathematical techniques and algorithms may be suitable for statistically sampling parameters and propagating the parameters' uncertainties to the resulting models, and all such techniques and algorithms are within the scope of the present disclosure.

After setting up the initial conditions for the second history matching iterations (see the '504 application), parameters are sampled as described above and a first likelihood function is applied to a resulting candidate model that quantifies the difference between realizations generated by the candidate model (using static simulation module 533) and corresponding historical data as an approximate likelihood of said difference. In at least some illustrative embodiments, this approximate likelihood is based at least in part upon a change in the model response as predicted by one or more sensitivity matrices (e.g., production data sensitivities provided by prior dynamic model simulations). Other sensitivity matrices may be also be used as part of the approximate likelihood function (such as the seismic data sensitivity matrix described in the '504 application), and all such matrices are within the scope of the present disclosure.

The approximate likelihood predicted by the likelihood function is assessed against a first acceptance criterion. Such an assessment may be implemented using, for example, a Metropolis-Hastings criterion like that described in the '504 application, though other suitable criterion may also be used. If the approximate likelihood does not meet the first acceptance criterion, the candidate model is discarded and another sample is performed to produce another candidate model that is similarly assessed. If the approximate likelihood does meet the first acceptance criterion, a second, more accurate likelihood function is applied to the candidate model. In at least some illustrative embodiments, the second likelihood function is based at least in part on the simulation results, a data misfit function and an array of sensitivity coefficients, as described in the '504 application. This second likelihood function is computationally more intensive than the first likelihood function, but may be applied to a subset of candidate models due to the pre-filtering performed by the first likelihood function. The resulting second likelihood is assessed against a second acceptance criterion in a manner similar to the first assessment described above. If the second likelihood does not meet the second criterion, the candidate model is discarded. If the second likelihood does meet the second criterion, the candidate model is added to the second history-matched models. This process is repeated until the second history-matched models meet a convergence criterion such as the maximum entropy criterion described in the '504 application, though other convergence criteria known in the art may also be suitable.

Once generated by second history matching module 536, the second history-matched models are used by third history matching module 538 to generate the third history-matched models (block 406) using a process similar to the first history match. Parameters for each of the second history-matched models are varied, wherein each of the resulting third history-matched models includes the updated values for the varied parameters that produce the least difference between the model's realizations and corresponding historical data. In at least some illustrative embodiments, parameters that may be varied and their corresponding match include, but are not limited to, varying a relative permeability end point while matching the water cut breakthrough time, varying a relative water permeability and/or a relative oil permeability while matching a water cut curve shape, and varying a skin factor and/or a transmissibility while matching a flowing bottom hole pressure. In at least some illustrative embodiments, matchings within the third history match are performed sequentially. Thus, for example, the water cut breakthrough time may first be matched, with the model using the updated water-cut-breakthrough-time-related parameters subsequently applied to the water cut curve shape matching. The model with the water-cut-curve-shape-related parameters is in turn used for matching the flowing bottom hole pressure, thus producing the third history-matched models.

Dynamic ranking module 540 (e.g., a streamline, full-physics or other similar comprehensive reservoir simulator) receives the third history-matched models and generates dynamic simulation realizations for each of the models using dynamic simulation module 535 (block 408). In at least some illustrative embodiments, the third history-matched models are ranked by dynamic ranking module 540 based on the predicted URF. The resulting ranked matched models are forwarded by dynamic ranking module 540 to forecast Presentation module 542, which uses one or more of the highest ranking models, or one or more user-selected ranked models, to perform one or more full simulations using dynamic simulation module 535 and forecast the future performance of the reservoir. The results of the simulations are presented by dynamic simulation module 535 to a user (block 410) via user interface subsystem 550, ending method 500 (block 412).

By using a static model during many of the history matching stages, only a subset of candidate models are applied by the dynamic simulator, which typically uses algorithms and data processing techniques that are more accurate and thus more computationally intensive than those typically used by static models. This use of the static simulators reduces the overall turnaround time of the history matching process compared to running full dynamic simulations on every candidate model. Such a turnaround time reduction allows the history matching to be performed more frequently, thus providing more timely forecasts and improved reservoir surveillance.

Numerous other modifications, equivalents, and alternatives, will become apparent to those skilled in the art once the above disclosure is fully appreciated. For example, although at least some software embodiments have been described as including modules performing specific functions, other embodiments may include software modules that combine the functions of the modules described herein. Also, although specific example of parameters were presented at each history matching stage, no limitations on the selection of parameters usable at each stage is implied, and any parameter used within any suitable reservoir simulation mode may be used at any of the history matching stages of the described systems and methods. It is intended that the following claims be interpreted to embrace all such modifications, equivalents, and alternatives where applicable.

What is claimed is:

1. A multi-level reservoir history matching method that comprises:
generating a first history-matched model using at least one updated model parameter derived from one or more existing model parameters;
generating a plurality of second history-matched models by applying a probabilistic inversion to the first history-matched model;
deriving a plurality of third history-matched models from the plurality of second history-matched models;
generating a plurality of dynamic simulation realization sets using each of the plurality of third history-matched models;
ranking each of the plurality of third history-matched models based at least in part on the plurality of dynamic simulation realization sets to identify a highest ranked third history-matched model; and presenting, by a computer, a production forecast via a display to a user based on the highest ranked third history-matched model.

2. The method of claim 1, wherein generating the first history-matched model comprises:
deriving a plurality of updated parameters by varying at least one existing parameter of the one or more existing model parameters over a range of values and assigning a value within the range to each of the plurality of updated parameters;
history matching a plurality of model realizations produced by a plurality of updated models that each includes one of the plurality of updated parameters; and
selecting the updated model parameter from the plurality of updated parameters that corresponds to one of the plurality of model realizations that meets at least one history matching criterion.

3. The method of claim 2, further comprising:
varying the at least one existing parameter for each of a plurality of wells within a reservoir;
wherein the at least one existing parameter comprises a parameter selected from the group consisting of a net-to-gross ratio, a facie type, a rock type and an initial water saturation; and
wherein meeting the at least one history matching criterion comprises identifying a difference of a plurality of differences between a simulated original oil in place (OOIP) measurement and a historical OOIP measurement for at least one of the plurality of wells smaller than other differences of the plurality of differences.

4. The method of claim 2, further comprising:
varying at least one existing parameter for each of a plurality of wells within the reservoir;
wherein the at least one existing parameter comprises a pore volume; and
wherein meeting the at least one history matching criterion comprises identifying a difference of a plurality of differences between a simulated reservoir pressure and a historical reservoir pressure for at least one of the plurality of wells smaller than other differences of the plurality of differences.

5. The method of claim 1, wherein generating the plurality of second history-matched models comprises:
generating one or more matched model parameters from the first history-matched model;
generating a probability distribution of each of the one or more matched model parameters;
generating a plurality of simulation realization sets, each realization set produced by one of a plurality of models each comprising one or more updated model parameters randomly selected from each probability distribution;
history matching the plurality of simulation realization sets against reservoir historical data; and
generating the plurality of second history-matched models from one or more of the plurality of simulation realizations sets each meeting at least one history matching criterion;
wherein the generation of the probability distribution is constrained at least in part by parameter sensitivities identified by a previously performed dynamic simulation.

6. The method of claim 1, wherein deriving the plurality of third history-matched models comprises:
deriving a plurality of updated parameters by varying at least one existing parameter from each of the plurality of second history-matched models over a range of values and assigning a value within the range to each of the plurality of updated parameters;
history matching a plurality of model realizations produced by a plurality of updated history-matched models that each includes one of the plurality of updated parameters; and
selecting the plurality of third history-matched models from the plurality of updated history-matched models that each corresponds to one of the plurality of model realizations that meets at least one history matching criterion.

7. The method of claim 6, further comprising:
varying the at least one existing parameter for each of a plurality of wells within a reservoir;
wherein the at least one existing parameter comprises a relative permeability end point; and
wherein meeting the at least one history matching criterion comprises identifying a difference of a plurality of differences between a simulated water cut breakthrough time and a historical water cut breakthrough time for at least one of the plurality of wells smaller than other differences of the plurality of differences.

8. The method of claim 6, further comprising:
varying the at least one existing parameter for each of a plurality of wells within a reservoir;
wherein the at least one existing parameter comprises a relative water permeability or a relative oil permeability; and
wherein meeting the at least one history matching criterion comprises identifying a difference of a plurality of differences between a simulated water cut curve and a historical water cut curve for at least one of the plurality of wells smaller than other differences of the plurality of differences.

9. The method of claim 6, further comprising:
varying the at least one existing parameter for each of a plurality of wells within a reservoir;
wherein the at least one existing parameter comprises a skin factor or a transmissibility factor; and
wherein meeting the at least one history matching criterion comprises identifying a difference of a plurality of differences difference between a simulated flowing bottom hole pressure and a historical flowing bottom hole pressure for at least one of the plurality of wells smaller than other differences of the plurality of differences.

10. A multi-level reservoir history matching system that comprises:
a memory having multi-level reservoir history matching software; and
one or more processors coupled to the memory, the software causing the one or more processors to:
generate a first history-matched model using at least one updated model parameter derived from one or more existing model parameters;
generate a plurality of second history-matched models by applying a probabilistic inversion to the first history-matched model;
derive a plurality of third history-matched models from the plurality of second history-matched models;
generate a plurality of dynamic simulation realization sets using each of the plurality of third history-matched models;
rank each of the plurality of third history-matched models based at least in part on the plurality of dynamic simulation realization sets to identify a highest ranked third history-matched model; and present a production forecast via a display to a user based on the highest ranked third history-matched model.

11. The system of claim 10, wherein the software causes the one or more processors to generate a first history-matched model, to generate a plurality of second history-matched models, or to derive a plurality of third history-matched models by:
deriving a plurality of updated parameters by varying at least one existing parameter of the one or more existing model parameters over a range of values and assigning a value within the range to each of the plurality of updated parameters;
history matching a plurality of model realizations produced by a plurality of updated models that each includes one of the plurality of updated parameters; and
selecting the updated model parameter from the plurality of updated parameters that corresponds to one of the plurality of model realizations that meets at least one history matching criterion.

12. The system of claim 11, wherein the software causes the one or more processors to:
vary the at least one existing parameter for each of a plurality of wells within a reservoir;
wherein the at least one existing parameter comprises a parameter selected from the group consisting of a net-to-gross ratio, a facie type, a rock type and an initial water saturation; and
wherein meeting the at least one history matching criterion comprises identifying a difference of a plurality of differences between a simulated original oil in place (OOIP) measurement and a historical OOIP measurement for at least one of the plurality of wells smaller than other differences of the plurality of differences.

13. The system of claim 11, wherein the software causes the one or more processors to:
vary the at least one existing parameter for each of a plurality of wells within a reservoir;
wherein the at least one existing parameter comprises a pore volume; and
wherein meeting the at least one history matching criterion comprises identifying a difference of a plurality of differences between a simulated reservoir pressure and a historical reservoir pressure for at least one of the plurality of wells smaller than other differences of the plurality of differences.

14. The system of claim 10, wherein the software causes the one or more processors to generate the plurality of second history-matched models by:
generating one or more matched model parameters from the first history-matched model;
generating a probability distribution of each of the one or more matched model parameters;
generating a plurality of simulation realization sets, each realization set produced by one of a plurality of models each comprising one or more updated model parameters randomly selected from each probability distribution;
history matching the plurality of simulation realization sets against reservoir historical data; and
generating the plurality of second history-matched models from one or more of the plurality of simulation realizations sets each meeting at least one history matching criterion;
wherein the generation of the probability distribution is constrained at least in part by parameter sensitivities identified by a previously performed dynamic simulation.

15. The system of claim 10, wherein the software causes the one or more processors to derive the plurality of third history-matched models by:
deriving a plurality of updated parameters by varying at least one existing parameter from each of the plurality of second history-matched models over a range of values and assigning a value within the range to each of the plurality of updated parameters;
history matching a plurality of model realizations produced by a plurality of updated history-matched models that each includes one of the plurality of updated parameters; and
selecting the plurality of third history-matched models from the plurality of updated history-matched models that each corresponds to one of the plurality of model realizations that meets at least one history matching criterion.

16. The system of claim 15, wherein the software causes the one or more processors to:
vary the at least one existing parameter for each of a plurality of wells within a reservoir;
wherein the at least one existing parameter comprises a relative permeability end point; and
wherein meeting the at least one history matching criterion comprises identifying a difference of a plurality of differences between a simulated water cut breakthrough time and a historical water cut breakthrough time for at least one of the plurality of wells smaller than other differences of the plurality of differences.

17. The system of claim 15, wherein the software causes the one or more processors to:
vary the at least one existing parameter for each of a plurality of wells within a reservoir;
wherein the at least one existing parameter comprises a relative water permeability or a relative oil permeability; and
wherein meeting the at least one history matching criterion comprises identifying a difference of a plurality of differences between a simulated water cut curve and a historical water cut curve for at least one of the plurality of wells smaller than other differences of the plurality of differences.

18. The system of claim 15, wherein the software causes the one or more processors to:
vary the at least one existing parameter for each of a plurality of wells within a reservoir;
wherein the at least one existing parameter comprises a skin factor or a transmissibility factor; and
wherein meeting the at least one history matching criterion comprises identifying a difference of a plurality of differences between a simulated flowing bottom hole pressure and a historical flowing bottom hole pressure for at least one of the plurality of wells smaller than other differences of the plurality of differences.

19. A non-transitory information storage medium having multi-level reservoir history matching software that comprises:
a first history matching module that generates a first history-matched model using at least one updated model parameter derived from one or more existing model parameters;
a second history matching module that generates a plurality of second history-matched models by applying a probabilistic inversion to the first history-matched model;

a third history matching module that derives a plurality of third history-matched models from the plurality of second history-matched models;

a dynamic model ranking module that generates a plurality of dynamic simulation realization sets using each of the plurality of third history-matched models and that further ranks each of the plurality of third history-matched models based at least in part on the plurality of dynamic simulation realization sets to identify a highest ranked third history-matched model; and a forecast presentation module that causes a computer to present a production forecast via a display to a user based on the highest ranked third history-matched model.

20. The storage medium of claim 19, wherein the first history matching module generates the first history-matched model by:

deriving a plurality of updated parameters by varying at least one existing parameter of the one or more existing model parameters over a range of values and assigning a value within the range to each of the plurality of updated parameters;

history matching a plurality of model realizations produced by a plurality of updated models that each includes one of the plurality of updated parameters; and selecting the updated model parameter from the plurality of updated parameters that corresponds to one of the plurality of model realizations that meets at least one history matching criterion.

21. The storage medium of claim 19, wherein the second history matching module generates the plurality of second history-matched models by:

generating one or more matched model parameters from the first history-matched model;

generating a probability distribution of each of the one or more matched model parameters;

generating a plurality of simulation realization sets, each realization set produced by one of a plurality of models each comprising one or more updated model parameters randomly selected from each probability distribution;

history matching the plurality of simulation realization sets against reservoir historical data; and generating the plurality of second history-matched models from one or more of the plurality of simulation realizations sets each meeting at least one history matching criterion;

wherein the generation of the probability distribution is constrained at least in part by parameter sensitivities identified by a previously performed dynamic simulation.

22. The storage medium of claim 19, wherein the third history matching module derives the plurality of third history-matched models by:

deriving a plurality of updated parameters by varying at least one existing parameter from each of the plurality of second history-matched models over a range of values and assigning a value within the range to each of the plurality of updated parameters;

history matching a plurality of model realizations produced by a plurality of updated history-matched models that each includes one of the plurality of updated parameters; and selecting the plurality of third history-matched models from the plurality of updated history-matched models that each corresponds to one of the plurality of model realizations that meets at least one history matching criterion.

* * * * *